Feb. 5, 1952

M. J. MILLER 2,584,807

TELEPHONE ATTACHMENT

Filed March 15, 1949

2 SHEETS—SHEET 1

INVENTOR.
MATHIAS J. MILLER
BY
Felix A. Russell
ATTORNEY

Feb. 5, 1952 M. J. MILLER 2,584,807

TELEPHONE ATTACHMENT

Filed March 15, 1949 2 SHEETS—SHEET 2

INVENTOR.
MATHIAS J. MILLER
BY Felix A. Russell
ATTORNEY

Patented Feb. 5, 1952 2,584,807

UNITED STATES PATENT OFFICE 2,584,807

TELEPHONE ATTACHMENT

Mathias J. Miller, Evansville, Ind.

Application March 15, 1949, Serial No. 81,441

6 Claims. (Cl. 179—157)

The present invention relates to telephone attachments and it consists in the combinations, constructions and arrangements of parts herein described and claimed.

Generally the invention comprises an improved attachment for the hand set type of telephone which is conventional at the present time and comprises a device which may be quickly and easily attached thereto without in any way whatever interfering with the mechanism thereof and which will, when not in use, take up a minimum of space with the least detraction from the appearance of the telephone apparatus. In fact, the device forming the present invention is so designed as to follow the contour of the present telephone in such manner that, if manufactured in the same color as the telephone, it will for all purposes be practically unnoticeable. Again, it is so designed that when extended for use it will support the conventional telephone upon the shoulder of the user without the necessity of the user moving his head and neck to an unnatural position such as is the great fault with present devices whose purpose is to support a telephone hand set in such manner as to leave the hands of the user free for other purposes.

It is accordingly an object of the invention to provide a device of the character set forth which is simple and inexpensive in its construction and yet effective and efficient in use.

Another object of the invention is the provision of a device of the character set forth which may be supported by one shoulder of the user thereof without the necessity for contorting the head or neck of such user.

Another object of the invention is the provision of novel means for attaching a device of the character set forth to a conventional telephone hand set.

A further object of the invention is the provision of a novel extensible arm structure forming a part of the invention.

A still further object of the invention is the provision of a novel arrangement of detents in the arm structure aforementioned.

Figure 1:
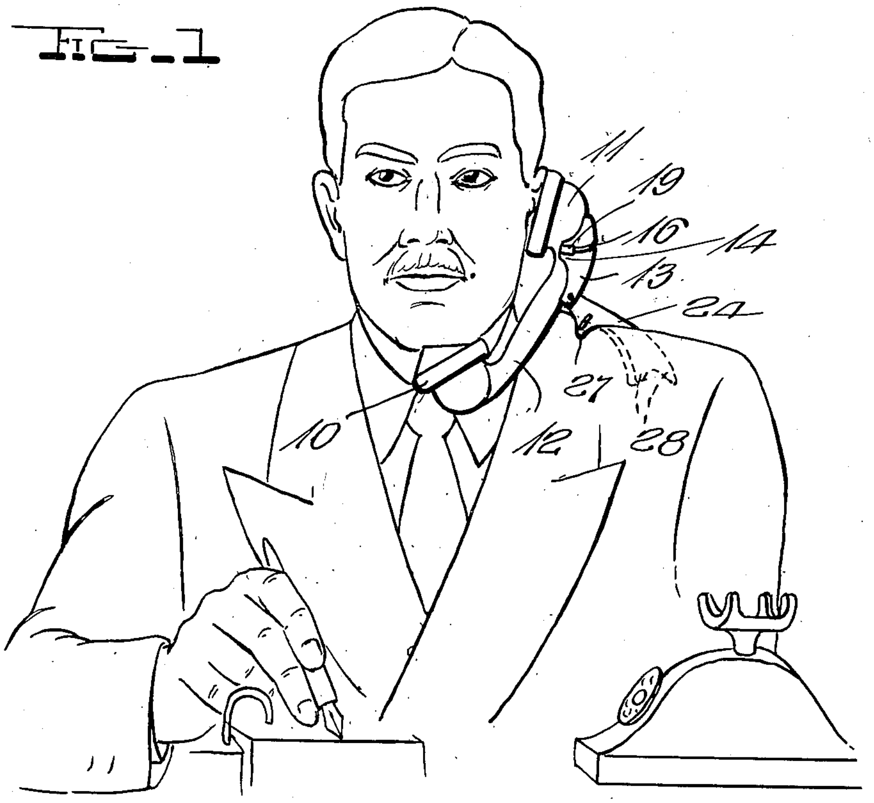
Figures 6, 7, 8, 9:
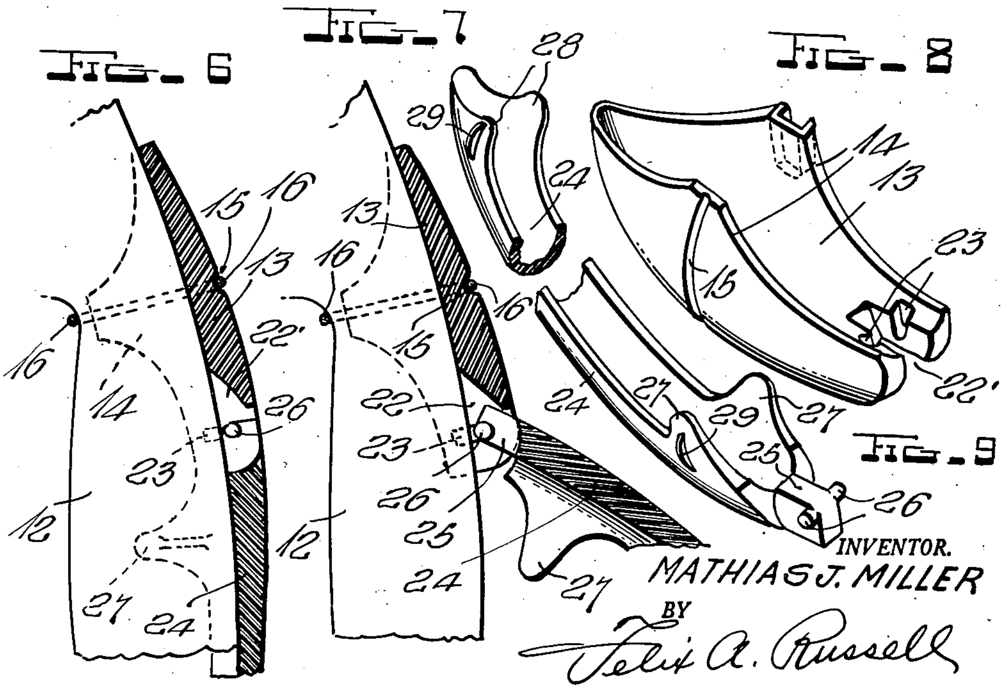
Figures 2, 3, 4, 5:
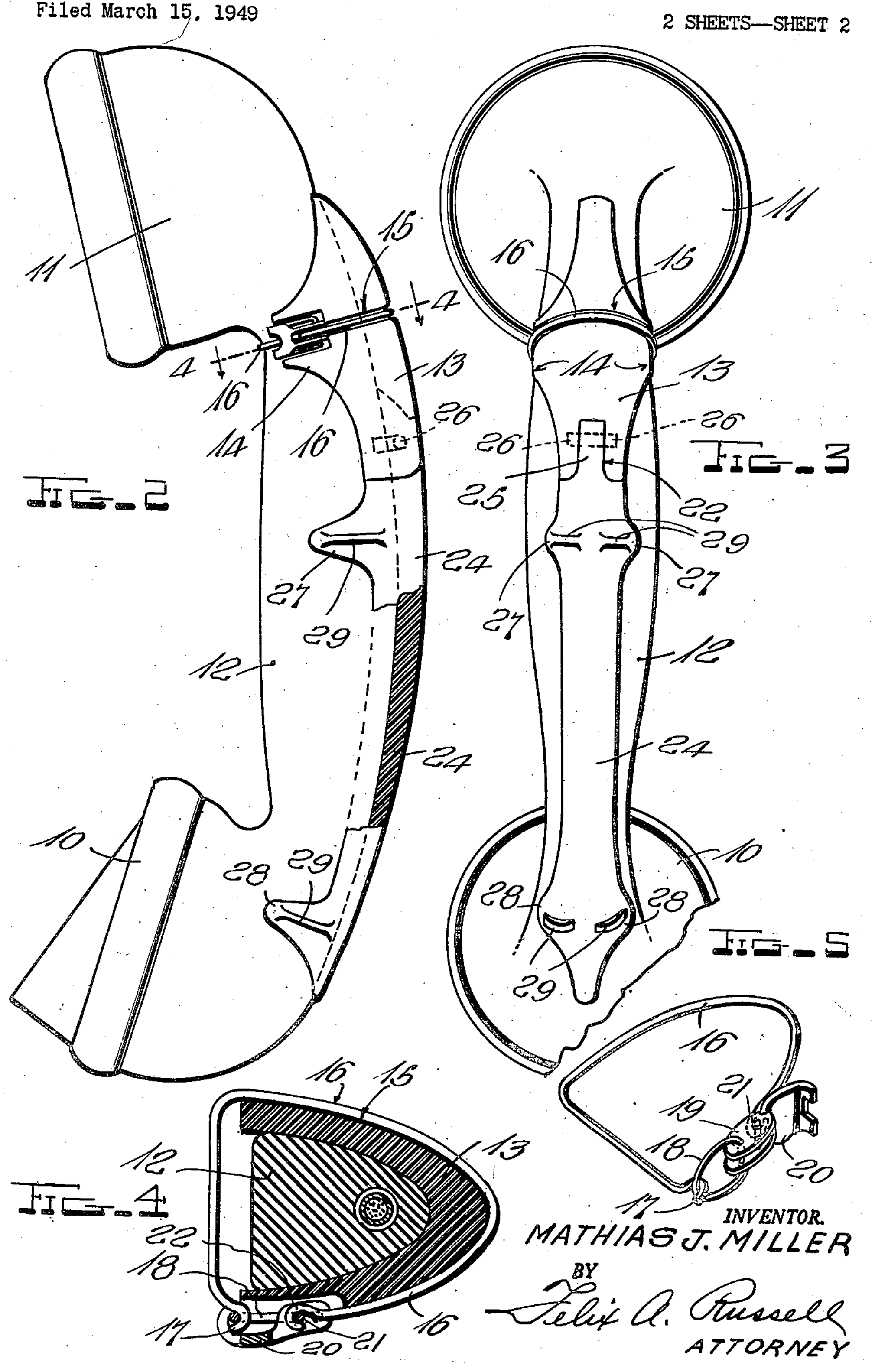

Other and further objects of the invention will become apparent from a reading of the following specification taken in conjunction with the drawings, in which:

Figure 1 is a perspective view of an embodiment of the invention shown in use with a conventional telephone hand set, Figure 2 is an enlarged side elevational view, partly broken away, of the invention shown in closed position upon a telephone set, Figure 3 is an elevational view taken at right angles to Figure 2, Figure 4 is an enlarged sectional view taken along line 4—4 of Figure 2, Figure 5 is a perspective view of a clamping device forming a part of the invention, Figure 6 is a fragmentary sectional view showing the attachment in closed position and illustrating certain details of construction, Figure 7 is a view similar to Figure 6 but showing the attachment in opened position, Figure 8 is a perspective view of an element of the invention, and Figure 9 is a perspective view, partly broken away, of another element of the invention.

Referring more particularly to the drawings, there is shown therein a telephone instrument having a transmitter 10, a receiver 11 and a grip portion 12. The device forming the present invention comprises a body 13 having a pair of integrally formed arms 14 which are adapted to encompass the sides of the grip portion 12 of the telephone instrument.

The body 13 is provided with a circumferentially extending groove 15 which is centrally disposed in the outer face thereof and which provides means for the reception of a wire gripping member 16 one end of which is provided with a hook 17 which may be releasably connected with a link 18 which is, in turn, pivotally connected with the body 19 of a latch member to whose other end is pivotally connected a camming member 20 which is provided with a transversely extending shaft 21 upon which is engaged a hook formed in the other end of the wire 16.

The body 13 is formed at one end with a slot 22′ communicating with either side of which is a recess 23.

A supporting arm 24 is also provided and one end has integrally formed therein a projection 25 which is adapted to be positioned in the slot 22. The projection 25 is provided with a pair of outwardly extending studs 26 which are engageable in the recesses 23.

The arm 24 is formed with a pair of integrally formed detents 27 adjacent the projection 25 and a pair of integrally formed detents 28 adjacent the free end thereof. Each of the detents 27 and each of the detents 28 is provided upon its outer face with a ridge 29 whereby the same is reinforced.

In operation, it will be apparent that the device as a whole may be mounted upon the telephone instrument by removing the hook 17 from the link 18 and thereafter mounting the body 13 upon the hand portion 12 of the telephone instrument in such manner that the arms 14 encompass that portion of the instrument adjacent the receiver 11. Thereafter the hook 17 is placed within the link 18 and the latch 19 closed by moving the cam member 20 to closed position such as is indicated in Figure 4 of the drawings. The arm 24 will have been previously hingedly connected to the body 13 by placing the projection 25 in the slot 22 and the studs 26 in the recesses 23. When the device is not in use the arm 24 will lie against the outer surface of the hand portion 12 and the outer surface of the transmitter 10 of the telephone instrument, the detents 27 and 28 lying upon either side of the instrument. When, however, it is desired to use the telephone instrument the arm 24 is swung outwardly from the instrument in the manner indicated in Figure 1 of the drawings and the detents 27 allowed to rest upon the forward side of the shoulder of the user while the detents 28 rest upon the rearward side of the shoulder of the user. In this manner it will be seen that the weight of the telephone instrument will cause the receiver 11 to rest against the ear of the user in such manner that both of his hands are free for other work. It will also be seen that the instrument is supported in such manner that the user thereof need not strain the muscles of his neck or shoulders in any manner whatsoever, the detents 27 and 28 taking up the major portion of the weight of the instrument and the attachment and the ear of the user taking up the remainder of the weight thereof. It will also be apparent that the detents 27 and 28, when the device is in operative position, are in planes which are more or less parallel to the outer surfaces of the user's adjacent ear, or in other words, in planes which are angularly disposed to a vertical plane extending centrally from front to rear of the user's head when the latter is in a normal position.

While but one form of the invention has been shown and described herein, it will be readily apparent to those skilled in the art that many minor modifications may be made without departing from the spirit of the invention or the scope of the appended claims.

What is claimed is:

1. A device of the character described comprising a base adapted to fit against the back of a telephone handset, a latch for holding said base upon the handset, an arm pivotally connected with said base, inner and outer detents carried by said arm and adapted to rest forwardly and rearwardly upon a user's shoulder in planes angularly disposed with relation to a vertical longitudinal plane of the user's head when the arm is in extended position.

2. A device of the character described comprising a base adapted to fit against the back of a telephone handset, a latch for holding said base upon the handset, an arm pivotally connected with said base, inner and outer detents carried by said arm and adapted to rest forwardly and rearwardly upon a user's shoulder in planes angularly disposed with relation to a vertical longitudinal plane of the user's head when the arm is in extended position, said detents being integrally formed with said arm and partially encompassing the handpiece of said handset when said arm is in closed position.

3. A device of the character described comprising a base adapted to fit against the back of a telephone handset, a latch for holding said base upon the handset, an arm pivotally connected with said base, inner and outer detents carried by said arm and adapted to rest forwardly and rearwardly upon a user's shoulder in planes angularly disposed with relation to a vertical longitudinal plane of the user's head when the arm is in extended position, said detents being integrally formed with said arm and partially encompassing the handpiece of said handset when said arm is in closed position and said base and said arm each having an inner face formed to the contour of the outer face of said handpiece.

4. A device of the character described comprising a base adapted to fit against the back of a telephone handset adjacent the transmitter thereof and having a transversely extending groove in its outer face, a wire belt encircling said handset and said base and lying in said groove in said base, a latch interconnecting the ends of the wire belt, an arm pivotally connected with said base, inner and outer detents carried by said arm and adapted to rest forwardly and rearwardly upon a user's shoulder in planes angularly disposed with relation to a vertical longitudinal plane of the user's head when the arm is in extended position.

5. A device of the character described comprising a base adapted to fit against the back of a telephone handset adjacent the transmitter thereof and having a transversely extending groove in its outer face, a wire belt encircling said handset and said base and lying in said groove in said base, a latch interconnecting the ends of the wire belt, an arm pivotally connected with said base, inner and outer detents carried by said arm and adapted to rest forwardly and rearwardly upon a user's shoulder in planes angularly disposed with relation to a vertical longitudinal plane of the user's head when the arm is in extended position, said detents being integrally formed with said arm and partially encompassing the handpiece of said handset when said arm is in closed position.

6. A device of the character described comprising a base adapted to fit against the back of a telephone handset adjacent the transmitter thereof and having a transversely extending groove in its outer face, a wire belt encircling said handset and said base and lying in said groove in said base, a latch interconnecting the ends of the wire belt, an arm pivotally connected with said base, inner and outer detents carried by said arm and adapted to rest forwardly and rearwardly upon a user's shoulder in planes angularly disposed with relation to a vertical longitudinal plane of the user's head when the arm is in extended position, said detents being integrally formed with said arm and partially encompassing the handpiece of said handset when said arm is in closed position, and said base and said arm each having an inner face formed to the contour of the outer face of the said handpiece.

MATHIAS J. MILLER.

REFERENCES CITED

The following references are of record in the file of this patent:

UNITED STATES PATENTS

| Number | Name | Date |
|---|---|---|
| 2,294,989 | Keely | Sept. 8, 1942 |
| 2,310,252 | Moomaw | Feb. 9, 1943 |
| 2,348,138 | Latus | May 2, 1944 |
| 2,447,721 | Wahl | Aug. 24, 1948 |